United States Patent
Gao et al.

[11] Patent Number: 6,117,812
[45] Date of Patent: Sep. 12, 2000

[54] DUAL FUNCTIONAL CATALYST OF PACKING TYPE AND THE CATALYTIC DISTILLATION EQUIPMENT

[75] Inventors: Buliang Gao; Jinyong Zhang; Jinshan Wang; Xingren Hao; Zaiqun Yu; Wei Wang, all of Shandong Province, China

[73] Assignees: China Petro-Chemical Corporation, Beijing; Qilu Petro-Chemical Corporation Sinopec, Zibo, both of China

[21] Appl. No.: 09/166,931

[22] Filed: Oct. 6, 1998

[51] Int. Cl.[7] .............................. B01J 31/00; B01J 23/42; B01J 23/00; B01J 20/00; B01J 21/04

[52] U.S. Cl. .................... 502/159; 502/155; 502/168; 502/216; 502/313; 502/322; 502/323; 502/333; 502/339; 502/349; 502/402; 502/415; 502/439; 502/527.11; 502/527.13; 502/527.14; 502/527.21; 502/527.24

[58] Field of Search ................. 502/527.11, 439, 502/527.14, 527.21, 527.13, 527.24, 150, 155, 159, 168, 402, 415, 313, 322, 323, 333, 339, 349, 216

[56] References Cited

U.S. PATENT DOCUMENTS

| | | | |
|---|---|---|---|
| 2,212,932 | 8/1940 | Fairlie | 502/527.21 |
| 4,018,669 | 4/1977 | Hayes et al. | 208/139 |
| 4,402,870 | 9/1983 | Schurmans | 502/439 |
| 5,045,518 | 9/1991 | Heinerman et al. | 502/216 |
| 5,130,287 | 7/1992 | Sweeney | 502/349 |
| 5,168,090 | 12/1992 | Ebner et al. | 502/209 |
| 5,633,217 | 5/1997 | Lynn | 502/439 |
| 5,759,942 | 6/1998 | Tan et al. | 502/168 |
| 5,856,263 | 1/1999 | Bhasin et al. | 502/333 |

FOREIGN PATENT DOCUMENTS

| | | |
|---|---|---|
| 1060228 | 4/1992 | China . |
| 1065412 | 10/1992 | China . |
| 2 193 907 | 2/1988 | United Kingdom . |

*Primary Examiner*—Mark L. Bell
*Assistant Examiner*—Patricia L. Hailey
*Attorney, Agent, or Firm*—Pennie & Edmonds LLP

[57] ABSTRACT

The present invention relates to a dual functional catalyst having both the catalytic reaction function and fractionation function and a catalytic distillation equipment for packing the catalyst therein. Said catalyst has a special shape and can be packed at random into the reaction section of said equipment. So, there exist adequate free spaces inside pellet and between pellets, enabling the vapor and liquid streams to pass through the catalyst beds directly and countercurrently, and contact with the dual functional catalyst directly. The reaction between the reactants and fractionation of products can be carried out simultaneously. Thus a high reaction efficiency is achieved. No special inner part is needed in the reaction section to pack the catalysts, so the structure of the equipment is simple and easy to operate, and the investment and cost of operation are low.

19 Claims, 2 Drawing Sheets

DUAL FUNCTIONAL CATALYST OF PACKING TYPE AND THE CATALYTIC DISTILLATION EQUIPMENT

FIELD OF THE INVENTION

This invention relates to a dual functional catalyst having not only catalytic reaction function, but also fractionation function, and the catalytic distillation equipment for packing said catalyst therein.

BACKGROUND OF THE INVENTION

The catalytic distillation technique is to carry out reaction of reactants and separation of products in the same catalytic distillation apparatus, while the reaction(s) is being carried out, the formed product is separated out simultaneously, thereby the reaction equilibrium will be broken through continuously, making the reaction toward completion and increasing the conversion of reactants. Furthermore, as the reaction heat is absorbed by vaporizing some of the components, not only the reaction temperature will be kept constant and the energy consumption of the process reduced significantly, but also the technological process will be simplified and the investment reduced greatly. Generally, the catalytic distillation column consists of three sections: a rectification section at the upper part, a catalytic reaction section at the middle part and a stripping section at the lower part of the column. In the catalytic distillation column, the downward flowing liquid stream and upward flowing vapor stream must flow countercurrently through the catalytic reaction section at the middle part to carry out reaction of reactants and fractionation of products simultaneously therein. However, the particle size of conventional catalysts is too small, the flow resistance in the catalyst beds will be even so high as to make the downward flowing liquid and the upward flowing vapor streams difficult to pass countercurrently through the reaction section at the middle part of the column, and consequently make the equipment impossible to run normally and the reaction of reactants and fractionation of products impossible to be carried out simultaneously.

In order to solve the problems aforesaid, some catalytic distillation equipments or methods for packing catalyst have been reported in literatures. For example, U.S. Pat. No. 4,471,154 proposes to use catalyst packed in capsules, made of fabrics or stainless-steel mesh which are permeable to liquid but impermeable to catalyst particles, then these capsules are disposed on fractionating trays in the reaction section at the middle part of the column to have the reactants diffusing into the capsules, contacting with the catalyst and taking part in reaction when they flow across the trays. But the catalyst inventory of this structure is limited. U.S. Pat. No. 4,215,011 discloses a method of with catalyst packed in a number of bags, and the catalyst bags are placed in said reaction section at the middle part of the column, having certain gap between the bags to allow liquid and vapor streams to pass countercurrently through said reaction section. U.S. Pat. No. 3,579,309 discloses a structure wherein a number of small reactors are arranged outside the column, liquid stream flows from an upper tray through the small reactor outside the column and then back into next tray. Thus the structure is complicated and the flow resistance of fluid is still high. In U.S. Pat. No. 3,634,534, the catalyst is placed in downcorners of the trays, the inventory of catalyst is limited significantly. Besides, there are also other similar structures, but some of them are either complicated structures, or in some others the amount of catalyst is limited, or in some the reacion efficiency is influenced due to the use of catalyst packed in small fabric capsules, thus not only the reactants have to diffuse into the small capsules to contact with catalyst and undergo reaction, but also the products have to diffuse out therefrom after reacting.

U.S. Pat. No. 5,523,061 discloses a structure in which the catalyst is packed into a number of overlapping-arranged fixed beds, between two adjacent beds conventional trays is disposed, thus, only the liquid stream can pass through the catalyst bed and undergo reaction, and the mass transfer and heat exchange can carry out on the trays between the vapor stream passing through the vapor channel and the liquid stream coming from the upper catalyst bed. Since the vapor stream can not contact with the catalyst directly, the reaction efficiency is affected. In the invention of CN 1065412A, the catalyst is placed between ripple packings, the structure is complicated.

It is proposed in U.S. Pat. No. 4,250,052 that the packing type sulphonated resin catalyst with an inert skeleton is prepared by dissolving, at first, a vinyl aromatic polymer or copolymer in a solvent, coating the substrate of conventional distillation packing with the resulting solution, then sulphonating the coated packing. However, the content of active component in the catalyst prepared by this process is low, and also the apparatus utilization coefficient is low; especially, the problems such as stripping and peeling off the active components from the substrate and so on are resulted owing to different rates of expansion, swelling and shrinkage between the substrate and active components, and changes of other environmental factors such as temperature and medium and the like. In U.S. Pat. No. 4,194,964, it is described only that the catalyst can be made into conventional shapes of packing, for instance, Raschig rings, Pall ring and rectangular saddle shape and the like, but not any method of preparation is described, moreover, the external surface area of the Raschig rings is small, separation efficiency and reaction efficiency are low, and its strength is also weak; it is difficult to mould the catalyst materials into other shapes. U.S. Pat. No. 5,235,102 proposes that the catalyst is prepared as beehive-shaped regular packing having 1000 cells, preferably 100~200 cells per square inch. But the flow resistance over this catalyst is high because of its small pore channel; furthermore, it requires that a worker should enter the column to arrange this regular shaped packing one by one, manually, in a vertical position, and that the deactivated catalyst packing should be removed in the same way; such operation is arduous, and the residual organic material in the column is harmful to human body. The disclosure of CN 1060228A is mainly that the active components of catalyst are made into a tray, but in doing so there are great difficulties technologically, besides the catalytic surface area contacting with the reaction stream is very limited. The patent also proposes to make the catalyst into Raschig rings, vehicle wheel shape, Pall rings, rectangular saddles, spherical or cylindrical shapes, or the regular packings of ripple shape or beehive shape. However, the Raschig rings, which have low external surface area and weak strength, are unfavourable to the reaction and fractionation; wheel shaped catalyst has low external surface area and low allowable flow flux of vapor and liquid; Pall rings and rectangular saddle shape are difficult to be moulded directly with the catalyst materials; the spherical and cylindrical catalysts have too small free space formed in the beds and higher flow resistance to allow the vapor and liquid stream passing countercurrently through the reaction section; as for said ripple or beehive shaped regular packings, they also need to be loaded and unloaded manually in the column, and they are also difficult to be made with the catalyst materials directly. GB2193907 discloses a hollow catalyst with external ribs characterized in that the external ribs are arranged to avoid the adjacent catalyst pellets interlocking each other, for use in tubular reactor for conducting gas phase reaction such as the steam conversion and oxidation in order to improve the distribution of fluid and reduce the pressure drop. Even though it is used as a dual function catalyst in the catalytic distillation, the hollow shaped catalyst is unfavourable for increasing the efficiency of reaction and fractionation owing to its small external surface area.

OBJECT OF THE INVENTION

An object of this invention is to develop a dual functional packing-type catalyst having special shapes and the catalytic distillation equipment for packing said catalyst therein in order to overcome the deficiencies in the prior art.

The special shapes of catalysts of the invention are designed to increase the counter current flow flux of vapor and liquid streams.

The catalytic distillation technique of the present invention is devised to make the active substance of the catalyst or the catalyst carrier into one having large external surface area and high strength, capable of being moulded into a given shape easily, and when packed at random into the catalytic reaction section of the catalytic distillation column, there will be adequate voidage inside the catalyst pellets and therebetween to meet the requirement for countercurrent flow of both vapor and liquid phases; the content of the catalyst materials in unit volume is high as the whole catalyst pellet is made of the catalyst materials, so the utilization ratio of the reaction section of the apparatus will be higher.

SUMMARY OF THE INVENTION

The invention relates to dual functional catalysts in given shapes which have both catalytic reaction function and fractionation function, and a novel catalytic distillation equipment packed with said catalyst. The catalysts of the present invention are made into special shape of packing for fractionation, which can be loaded directly into the reaction section at the middle part of the catalytic distillation column. Said catalyst of the invention comprises enough free spaces inside the catalyst pellet and between the catalyst pellets to enable it to catalyze the reaction and separate the products simultaneously when vapor and liquid streams passing countercurrently through the catalyst beds in the reaction section. As the catalyst has large external surface area and high strength, and both the vapor and liquid phase reaction materials can contact directly with the catalyst, the efficiency of reaction and fractionation is increased, and moreover, the proportion of the catalyst material is high in per unit volume of the bed, this is also favourable for increasing reaction efficiency. Because the catalyst can be easily loaded into the apparatus and no other specific structural parts are required, the structure of the apparatus can be simplified, the investment reduced, and the operation also simplified.

CHARACTERISTICS OF THE INVENTION AND COMPARISON WITH THE PRIOR ART

Figure 1:
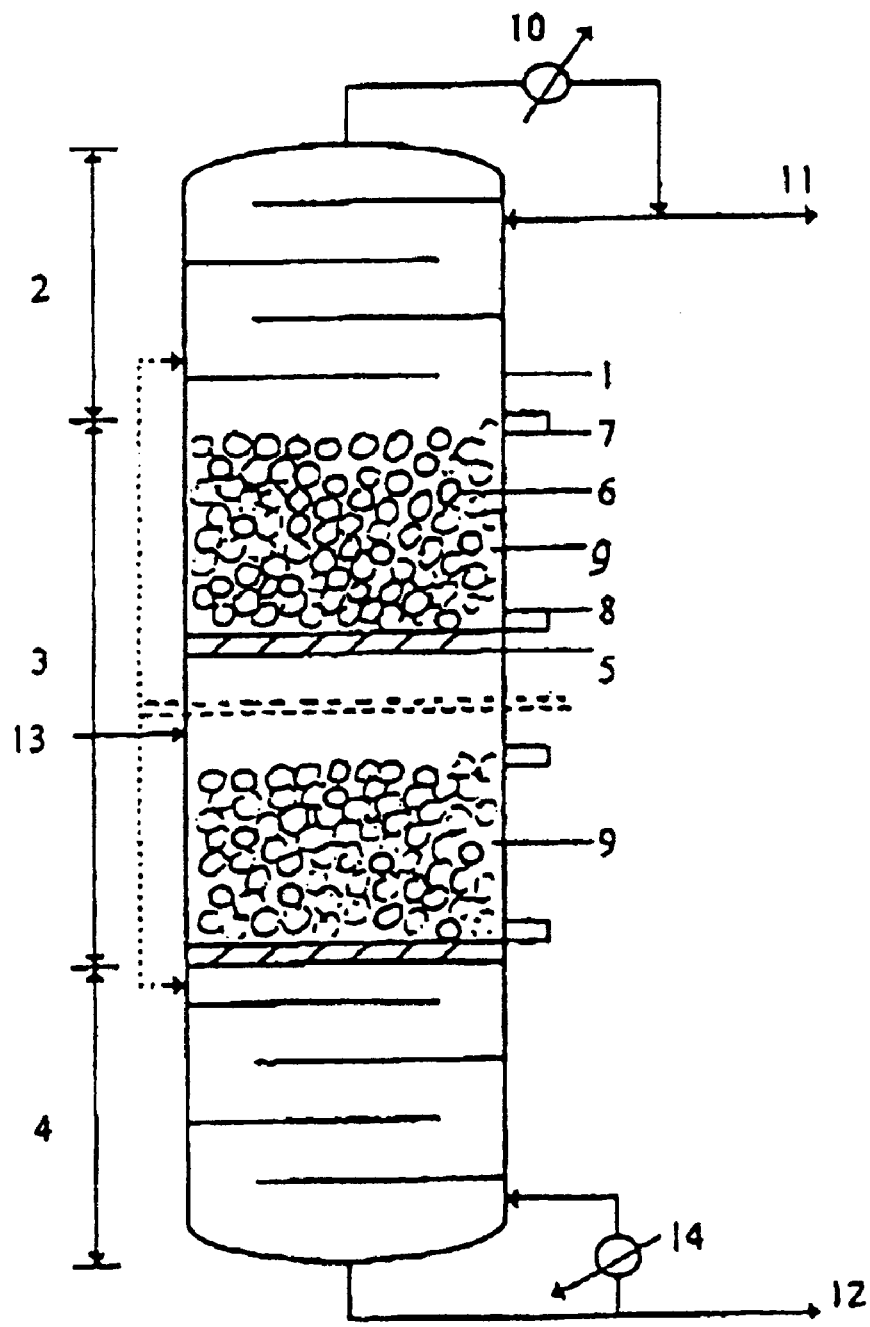
FIG. 1 is an illustrative scheme of the structure of the catalytic distillation column according to the present invention.

There are two types of catalyst of the present invention in special shapes:

1. A window-lattice shaped catalyst with external teeth having moderate free space inside pellet and between pellets, suitable for use in the catalytic distillation equipment of normal flow flux. 2. The star-shaped catalyst with inner spokes having large free spaces inside and between the pellets, for use in the catalytic distillation equipment which requires high flow flux.

Both the aforesaid two shapes of the dual functional catalyst can be loaded at random directly through the catalyst inlet into the reaction section of the catalytic distillation equipment, and the used deactivated catalyst can also be unloaded directly from the catalyst outlet without having worker enter the column to load and unload catalyst, thus preventing human body from any harm in the residues in the column, and it is convenient to operate and low in operation cost. But in the prior art the catalyst made into regular packings in ripple or beehive shape, requires that the fresh catalyst must be placed one by one manually in the column, and the deactivated catalyst also must be removed in the same manner, such operation is not only consumptive in time, labour and cost, but also harmful to workers who may be poisoned by the residue materials when working for a long period inside the column.

As viewed from the content of catalyst materials, both the specially shaped catalysts of the invention are prepared and moulded by using the catalyst material itself and a small amount of auxiliary agent, the preparation methods are simple and the catalyst per se has enough strength required; as to the prior art using the method of coating the skeleton of packing type with the catalyst materials, the catalyst material coating is only a small portion of the whole catalyst pellet, so the content of catalyst material is low based on unit volume of the catalyst bed in the reaction section, there is less chance of contact between reaction material and catalyst, and thus it is low in reaction efficiency.

As viewed from the external surface of catalyst, the external surface area of the two shapes of catalyst according to the invention is larger than that of the catalyst of Raschig rings, the vehicle wheel shape and the hollow shape with external ribs and so on, so there is more chance of contact between reaction material and catalyst, and higher reaction efficiency, which are also favourable for the mass transfer and heat exchange between the materials both in vapor and liquid phases on the catalyst surface and thereby the fractionation efficiency is increased.

As viewed from the free space formed inside pellet and between pellets of catalysts, the voidage of the bed in reaction section formed respectively by the two shapes of catalyst of the present invention, is higher than that formed by the spherical, cylindrical, or vehicle wheel shape of catalyst and the like, and so the flow flux of the two phase streams of vapor and liquid is also higher.

With respect to the moulding of catalyst, the special shapes of the catalyst according to the invention can be obtained by extruding or pressing directly, but Pall rings, rectangular saddles and ripple or beehive regular packings are not easy, or are very difficult, to be moulded directly with catalyst materials.

To sum up, the dual functional catalyst in special shapes of the invention has large external surface area, high content of catalyst material per unit volume of bed, and high reaction and fractionation efficiency. It is easy to mould, simple and convenient to produce, and handy to operate. The catalyst can be directly loaded and unloaded through inlet and outlet without manual work inside column, preventing human body from harmful toxic matters. The free spaces formed in the beds are large for both vapor and liquid phase streams passing countercurrently through, the catalyst can be packed directly at random into the reaction section without special loading structure, and the flow flux of the vapor and liquid is great.

DETAILED DESCRIPTION OF THE INVENTION

The present invention provides a catalyst, which can be loaded at random directly into the catalytic distillation column and related catalytic distillation equipment, wherein said catalyst is a dual functional one having not only catalytic activity, but also fractionation function; the reaction material can react directly on the catalyst surface to achieve high efficiency of reaction and fractionation; and the catalyst is easily loaded and unloaded and the structure of the reaction section is simple.

A main technical feature of the present invention lies in that the dual functional catalyst developed in the invention has large external surface area, high reaction activity and adequate free spaces inside the catalyst pellet and between the catalyst pellets; the catalyst can be loaded directly into the catalytic reaction section, in which the upward flowing vapor stream and the downward flowing liquid stream can pass countercurrently through the reaction section and contact directly with the catalyst and carrying out reaction and fractionation.

Figure 2:
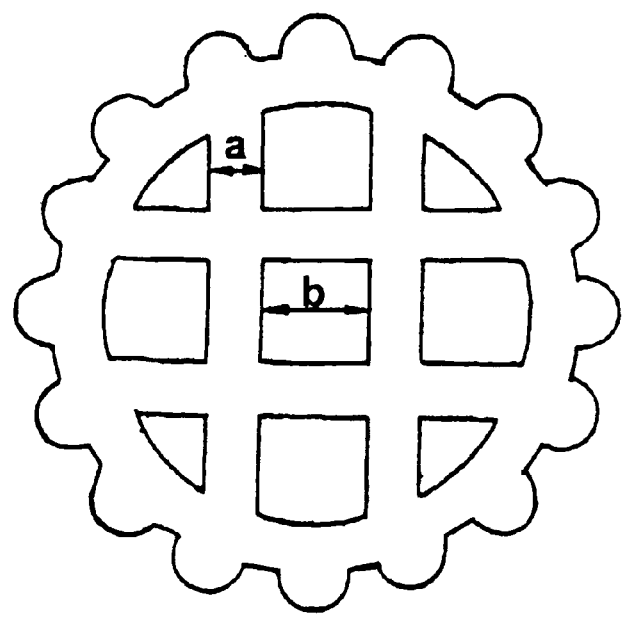
FIG. 2 shows illustratively the cross section of the window-lattice shaped catalyst with external teeth.
Figure 3:
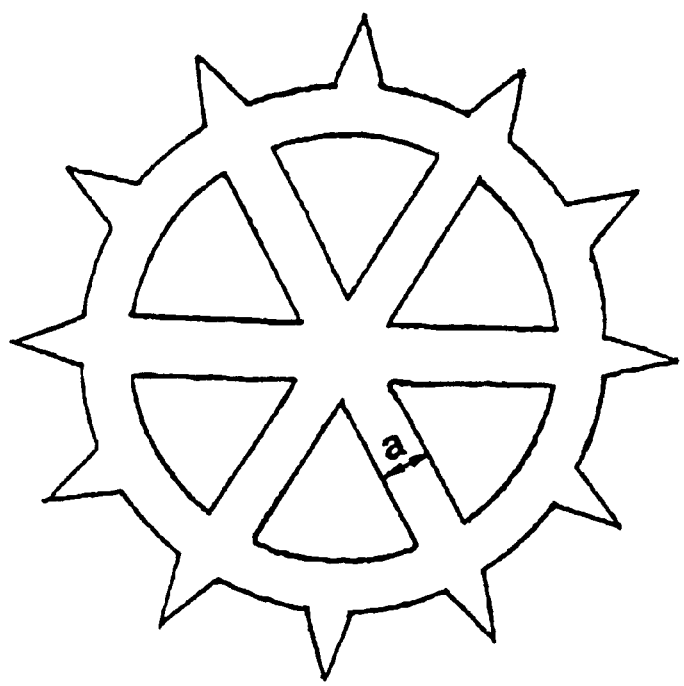
FIG. 3 shows illustratively the cross section of the star-shaped catalyst with inner spokes.

The catalyst pellet according to the invention has an equivalent diameter of 6 mm–100 mm, preferably 15 mm–60 mm. Its height to diameter ratio is 0.2–3:1, preferably 0.5–2:1. The cross section of the catalyst may be one of the two shapes shown in the FIG. 2 and FIG. 3. FIG. 2 shows a window-lattice shaped catalyst with external teeth, which has large external surface area favourable not only for carrying out reaction, but also increasing the efficiency of fractionation, and is characterized in that the distance "b" between two opposite sides in each cell is within the range of 2–8 mm, the thickness of the rib "a" is within the range of 1–6 mm, the height of each catalyst pellet is within the range of 10–100 mm, preferably 15–60 mm. The catalyst pellets are loaded at random in the reaction section at middle part of the catalytic distillation column to allow the vapor and liquid stream to pass countercurrenly through the pore channel inside catalyst and the void between catalyst pellets, not necessary to be placed in a vertical position. FIG. 3 shows a star-shaped catalyst with inner spokes, which has relatively large free space inside the pellet, is suitable for use in the catalytic distillation column allowing relatively high flow flux of fluid and relatively high reaction and fractionation efficiency, and is characterized in that the number of spokes is 2–20, preferably 4–10, the thickness of the rib "a" is within the range of 1–6 mm. The body form of the catalyst pellet may be cylindrical, elliptical, or multilateral and other similar shapes.

The catalyst pellets in any one of the shapes shown in FIGS. 2 and 3, or the mixture thereof, can be loaded at random into the reaction section of the catalytic distillation column, the free space formed between the catalyst pellets occupies a volume of 20–60%, preferably 30–60%, of the total volume of the catalyst beds, the free space formed by the pore channel inside the catalyst pellet occupies a volume of 20–70%, preferably from about 30–60%, of the total volume of catalyst pellet. Thus, the reaction section formed in the catalytic distillation column enables the upward flowing vapor stream and the downward flowing liquid stream to pass countercurrently through the reaction section contacting directly with the external surface of the catalyst as well the internal surface of pore channel inside catalyst, and carrying out reaction and mass and heat transfer. The capacity of vapor and liquid flow flux permitted by the free spaces formed inside the catalyst pellet and between the catalyst pellets according to the invention is corresponding with that permitted by the conventional trays and packings.

FIG. 1 shows a schematic diagram of the structure of the catalytic distillation column, wherein the column 1 comprises a rectification section 2 at the upper part, a reaction section 3 at the middle part, and a stripping section 4 at the lower part. The supporting-plate 5 in the reaction section at the middle part is loaded with the dual functional catalyst 6 of the invention; when the amount of the catalyst held-on is greater, the catalyst in the reaction section can be divided into several layers of catalyst beds. In the column, the upward flowing vapor stream and the downward flowing liquid stream will pass countercurrently through the catalyst beds of said reaction section, contacting directly with the catalyst and carrying out reaction and fractionation. In the rectification section at the upper part and the stripping section at the lower part, conventional fractionation trays or packings can be used. The catalyst beds may be provided with the supporting-plate 5, catalyst inlet 7 and outlet 8 for loading or unloading the catalyst directly, thus when the fresh catalyst is loaded and the deactivated catalyst is unloaded, the work can be done conveniently and needs not to have an operator enter the column. Feedstock 13 is fed into the column from the reaction section or rectification section, or stripping section, and the liquid stream from the lowermost tray or packing layer of the rectification section flows downward and passes through the catalyst beds 9 in the reaction section; the vapor stream from the uppermost tray or packing layer of the stripping section flows upward and passes through the catalyst bed 9 of the reaction section, wherein the reaction and fractionation between the liquid and vapor streams take place simultaneously by the action of the dual functional catalyst 6 in the catalyst beds 9 until the reaction is completed or the desired conversion is achieved. After reaction, the upward flowing vapor stream flows out from the top of the column and is cooled and condensed in a condenser 10, a part of the condensate returns back to the top of the catalytic rectification column as reflux, and the other part flows out of the unit as a low-boiling product 11. The downward flowing liquid stream, after reaction, flows out of the unit from the bottom, then a part of the liquid stream is vaporized via reboiler 14 and returns to the bottom of the unit, and the other part is discharged out of the unit as a high-boiling product 12. If there is no quality norms or no critical quality control of the product from the top of the unit, the rectification section may not be equipped. The amount of catalyst in the reaction section and the number of the catalyst beds depend upon the reaction conversion desired. The shape and size of the catalyst pellet may be selected according to the flow flux of the vapor stream and liquid stream flowing countercurrently in the reaction section.

The dual functional catalyst of the invention can be prepared with active components and a small amount of binder, for example, the sulphonic resin catalyst, metal oxide superacid catalyst and molecular sieve catalyst for hydration, etherification, esterification, ether cleavage and other reactions which can be catalyzed by acidic catalyst;

and molecular sieve catalysts for isomerization and alkylation; and also a dual functional catalyst can be prepared by making metal oxides or other similar materials into a carrier which is then impregnated with the active components necessary for different reactions. For example, hydrogenation and dehydrogenation catalysts can be prepared by impregnating or spraying the active components of Groups VI or VIII metals on a metal oxide carrier, e.g. alumina, which is suitable for hydrogenation and dehydrogenation reactons; and also an oxidation catalyst can be prepared with heteropoly acid and the oxides of vanadium for the oxidation reaction etc.

For example, a dual functional sulphonic acid resin catalyst in any one of the shapes as shown in the FIG. 2 and FIG. 3 may be prepared by sulphonating a copolymer of styrene and divinylbenzene with 98% sulfuric acid, preferably fuming sulfuric acid, then adding a binder and shaping in a moulding machine; or may also be prepared by adding a binder to the copolymer of styrene and divinylbenzene, and shaping the resulted mixture, then sulphonating the shaped matter with 98% sulfuric acid, preferably fuming sulfuric acid. This catalyst can be used for the acid catalytic reaction mentioned above. Compared with the catalyst prepared by coating sulfonic acid resin onto a skeleton of metal or ceramics, the content of the active components per unit volume of bed is high and the reaction efficiency and the ultilization ratio of the apparatus are also high. The problems can be avoided related with the catalytic material peeling off from the substrate and so on due to different swelling and shrinking ratios of the resin and the substrate during operation and stopwork.

Furthermore, for example, a feedstock, e.g. aluminium hydroxide, is slurried by adding nitric acid having concentration of 10–15% and an extruding-aids, then made into one of the shapes as shown in FIG. 2 and FIG. 3 in a moulding machine; the moulded product is dried first at a temperature of 100–200° C., preferably 105–115° C., for 0.5–3 h, preferably for 1–1.5 h, to remove surface water; then calcined at a temperature of 250–500° C., preferably 300–400° C., for 1–6 h, preferably for 2–5 h, to remove crystalline water, and further calcined at a temperature of 800–1500° C., preferably 1200–1350° C., for 2–12 h, preferably for 4–10 h, to form an $Al_2O_3$ carrier; the obtained carrier is then impregnated quantitatively with the Palladium salt e.g. $PdCl_2$ solution (2–5 g/l, the concentration of the $PdCl_2$ solution depends upon the pore volume of the catalyst); then the impregnated carrier is filtered, dried at a temperature of 100–150° C., and decomposed and reduced at a temperature of 200–700° C., preferably 400–600° C., to obtain a dual functional $Pd/Al_2O_3$ catalyst containing Pd 0.1–0.5%, preferably 0.2–0.4%, which is used for selective hydrogenation to remove dienes and alkynes from $C_2$–$C_5$ light hydrocarbon fraction or gasoline from steam cracking.

Also, for example, a feedstock, e.g. aluminium hydroxide, is moulded, dried, and then calcined at 400–800° C., preferably 500–600° C., for 2–12 h, preferably 4–10 h, to form an $Al_2O_3$ having one of the shapes shown in FIG. 2 and FIG. 3; then the resulting $Al_2O_3$ is impregnated with a salt of metal selected from Group VI or VIII, then the impregnated metal salt is decomposed at 300–600° C. Thus a dual functional catalyst can be obtained for hydrorefining petroleum fraction oils.

Also, for example, zirconium nitrate is used as a feedstock, colloided by adjusting the pH value to 8–12, preferably 110–120° C., with aqueous $NH_4OH$ solution, and the resulting colloid is filtered, washed to neutrality; after dried at 100–200° C., preferably 110–120° C., the dried product is sulphonated with sulfuric acid of 0.1–3 mol/L, preferably 0.5–1 mol/L for 2–3 h, washed again with water to neutrality, then dried and activated at 200–600° C., preferably 300–450° C., then after a binder is added, the activated product is moulded into one of the shapes as shown in the FIG. 2 and FIG. 3., to obtain a dual functional solid superacid catalyst which is used for the acid catalytic reaction processes, such as etherification and ether cleavage and alkylation and the like.

Also, for example, a molecular sieve having a $SiO_2/Al_2O_3$ ratio of 5–100, preferably 8–30 is used as a feedstock; after a binder is added, it is moulded into one of the shapes as shown in FIG. 2 and FIG. 3, to obtain a packing-type catalyst, which is then calcined at 300–900° C., preferably 400–700° C. for 4–6 h, to obtain a dual functional molecular sieve catalyst which can be used for the reaction processes, such as etherification, ether cleavage and hydrocarbon isomerization and so on.

The advantages of the invention are in that: the catalyst according to the invention has dual function of both catalysis and fractionation; the activity of catalyst is high as the catalytic materials or carrier are made into the special shapes which are easily to be moulded and the content of catalytic materials per unit volume of the bed is high; the reaction efficiency and fractionation efficiency are high because of high external surface area of the catalyst; the strength of the catalyst is high, therefore the catalyst can be loaded directly through the inlet into the catalyst beds of the catalytic distillation column and the deactivated catalyst can also be discharged from the outlet without manual operation inside the column; there is large free space inside pellet and between the pellets in the beds, enabling the liquid and vapor streams to flow directly and countercurrently through the catalyst beds, contacting directly with the dual functional catalyst and simultaneously carrying out reaction and fractionation, so its reaction efficiency is high; and no specific inner parts for loading catalysts are required in the reaction section, thus contributing to simple structure, reduced investment and low operation cost.

EXAMPLES

The following examples are carried out in a catalytic distillation column with a diameter of 120 mm, in which the rectification section and stripping section are filled with θ-shaped stainless steel mesh-ring packings of φ6×6 mm in size. In examples 1–4, the height filled with the packings is 2 m and 3.2 m respectively in the two sections, and in example 5, the height filled with the packings is 3.2 m and 4.0 m respectively in the two sections; the height of the reaction section at the middle part depends upon the requirement of the given reaction process.

Example 1

The copolymer formed by copolymerizing styrene and divinylbenzene with a crosslinking degree of 10–18%, after a binder was added, was extruded into a carrier of star shape with inner spokes, then the resulting extruded matter was sulphonated with 98% concentrated sulfuric acid, the excess sulfuric acid was filtered out, and the filtered product was washed with water to neutrality, the dual functional sulphonic acid resin catalyst of packing type was obtained; 6 liters of the dual functional sulfonic acid resin catalyst obtained aforesaid and 6 liters of sulphonic acid resin catalyst in the shape of Raschig rings prepared by the same method of the present invention as the comparative samples were packed separately into the reaction section at the middle part of respective catalytic distillation equipment of the present invention to produce MTBE (methyl tert-butyl ether) via the reaction between isobutene of $C_4$ fraction and methanol. The results are listed in Table 1:

TABLE 1

Results of Example 1 in comparison with CN 1060228 A

| Catalyst | The invention star shape with inner spokes | Comparative patent CN 1060228 A Example 1 reporter value | Comparative test value Raschig rings |
|---|---|---|---|
| Outer diameter, mm | 20 | 10 | 20 |
| Internal diameter, mm | 14 | 7 | 14 |
| Height of pellet, mm | 20 | 10 | 20 |
| Thickness of ring wall, mm | 3 | | 3 |
| Thickness of rib, mm | 2.5 | | |
| Height of the external tooth, mm | 2 | | |
| Exchanged equivalent, meg H*/g | 4.2 | — | 4.2 |
| Average pore diameter, nm | 25 | — | 25 |
| Specific surface area, $m^2/g$ | 38 | — | 38 |
| Average side pressure strength, Kg/pellet | 8.5 | — | 2.4 |
| Reaction conditions and results: | | | |
| Reaction pressure, MPa | 0.65 | 0.6~1.0 | 0.65 |
| Reaction temperature, ° C. | 60~65 | 40~100 | 60~65 |
| Ratio of methanol to isobutylene, mol/mol | 1.05 | given ratio | 1.05 |
| Reflux ratio, Vol/Vol | 1.0 | — | 1.0 |
| Inventory of catalyst, L | 6.0 | — | 6.0 |
| Space velocity, $h^{-1}$ | 3.0 | | 3.0 |
| Purity of MTBE, % | 99.1 | | 98.35 |
| Average conversion, wt % | 99.85 | 94.75 | 97.62 |

Example 2

6 liters of the dual functional catalyst obtained from the example 1 for etherification were packed into the catalytic distillation equipment of the present invention, to carry out the reaction between tert-amylenes of FCC $C_3$ fraction and methanol to form TAME(tert-amyl methyl ether). The results obtained are listed in Table 2:

TABLE 2

Results of Example 2

| Catalyst | Sulfonic acid resin catalyst same as that of example 1 |
|---|---|
| Reaction conditions and results: | |
| Reaction pressure, Mpa | 0.45 |
| Reaction temperature, ° C. | 65 ~ 75 |
| Ratio of methanol to tert-amylenes, mol/mol | 1.15 |
| Reflux ratio, vol/vol | 1 |
| Amount of catalyst, L | 6 |
| Space velocity, $h^{-1}$ | 1.5 |
| Purity of TAME, % | 98.0 |
| Tert-amylene conversion, wt % | 92.7 |

Example 3

Zirconium nitrate of 40 g/L concentration as feedstock was colloided by adjusting the pH value to 9.0–9.5 with $NH_4OH$ solution, then filtered, washed to neutrality with water, and dried at 110° C., then the dried product was sulphonated with sulfuric acid of 0.8 mol/L for 5 h, filtered, washed with water to neutrality, and after a binder was added the resulting product was moulded, the moulded matter was dried, and calcined at 500° C. for 5 h, to obtain a solid superacid catalyst of which the cross section was in the window-lattice shape with external teeth. 8 Liters of the dual functional solid superacid catalyst obtained by the process mentioned above were packed into the reaction section at the middle part of the catalytic distillation equipment of the present invention to carry out decomposition of MTBE to produce ibsobutene. The results of the test listed in Table 3:

TABLE 3

Results of Example 3

| Catalyst | The invention a 9-cell window-lattice shape external teeth |
|---|---|
| Outer diameter, mm | 20 |
| Thickness of ring wall, mm | 2.5 |
| Thickness of spoke, mm | 2.0 |
| Height of pellet, mm | 20 |
| Acid strength, Ho | −12.7 |
| Specific surface area, $m^2/g$ | 42.5 |
| Average side pressure strength, Kg/ pellet | 3.6 |
| Reaction conditions and results: | |
| Reaction temperature, ° C. | 165 |
| Reaction pressure, MPa | 0.7 |
| Space velocity, $h^{-1}$ | 3.5 |
| Reflux ratio, vol/vol | 1:1 |
| Decomposition conversion of MTBE, % | 98.5 |
| Selectivity to isobutene, % | 95.6 |

Example 4

After 25 wt % of a binder was added, the USY molecular sieve having a $SiO_2/Al_2O_3$ ratio of 13 was kneaded homogeneously and extruded into Star shape with inner spokes, then calcined at 600° C. for 4 h, a dual functional molecular sieve catalyst was obtained. 5 Liters of the dual functional molecular sieve catalyst prepared by the process mentioned above were packed into the reaction section at the middle part to carry out the alkylation reaction of benzene and ethylene, the results are listed in Table 4:

TABLE 4

Results of Example 4

| | a 9-cell star shape with spokes |
|---|---|
| Outer diameter, mm | 20 |
| Thickness of ring wall, mm | 2.5 |
| Thickness of spoke, mm | 2.0 |
| Height of pellet, mm | 20 |
| Specific surface area, m²/g | 620 |
| Average side pressure strength, Kg/pellet | 4.5 |
| Reaction conditions and results | |
| Reaction temperature, °C. | 210 |
| Reaction pressure, MPa | 3.6 |
| Reflux ratio, vol/vol | all refluxed |
| Space velocity, h⁻¹ | 1.5 |
| Ratio of ethylene to benzene made-up, mol/mol | 1:1 |
| Conversion of ethylene, wt % | ~100 |
| Selectivity to Ethylbenzene, % | 88.6 |

Example 5

Aluminium hydroxide with a sodium content less than 0.1% was used as a feedstock, and was slurried by adding 4% of a 10% $HNO_3$ solution; the 5% sesban powder is used as an extruding aids; the resulting paste was kneaded then extruded in a moulding machine into a carrier having a cross section in window-lattice shape with external teeth; then the carrier was dried at first at 110° C. for 1–1.5 h, calcined at 300–400° C. for 2–2.5 h to remove crystalline water, calcined again at 1200–1300° C. for 4–8 h to form a $Al_2O_3$ carrier; then the $Al_2O_3$ a carrier was impregrated with a 3 g/l $PdCl_2$ solution to give a Pd content of 0.25–0.30% on it; The obtained matter is then reduced in the presence of hydrogen at 70–100° C., to obtain a dual functional $Pd/Al_2O_3$ catalyst for selective hydrogenation to remove diene and acetylenes. 2 Liters of the catalyst obtained according to the invention and 2 liters of the catalyst of Raschig ring shape prepared by the same process of the invention were packed separately into the reaction section at the middle part of respective catalystic distillation equipment of the present invention to carry out selective hydrogenation of allene and propyne in $C_3+C_4$ mixture fraction from the steam cracking. The feedstock comprises 64.83% of propylene, 1.14% of propane, 2.25% of allene+propyne and 31.78% of $C_4$ Compounds. The test results are listed in Table 5:

TABLE 5

Results of Example 5

| Catalyst | Present invention Window-lattice shape with 9 cells and external teeth | Comparative Raschig rings |
|---|---|---|
| Palladium content, % | 0.24 | 0.24 |
| Outer diameter, mm | 20 | 20 |
| Internal diameter, mm | 15 | 15 |
| Thickness of ring wall, mm | 2.5 | 2.5 |
| Thickness of spoke, mm | 2.0 | — |
| Height of pellet, mm | 20 | 20 |
| Average pore diameter, nm | 210 | 240 |
| Specific surface area, m²/g | 25 | 25 |
| Average side pressure strength, Kg/pellet | 15 | 4.3 |
| Reaction pressure, MPa | 1.8 | 1.8 |
| Reaction temperature, °C. | 30 ~ 45 | 30 ~ 45 |
| Mole ratio of hydrogen to diene | 1.5 | 1.5 |
| and alkyne, mol/mol | | |
| Reflux ratio | 1.0 | 1.0 |
| Residue of allene and propyne in overhead fraction, ppm | <10 | <10 |
| Yield of propylene, % | 103.6 | 103.4 |
| Content of $C_4$ in overhead fraction, % | 0.43 | 0.81 |

What is claimed is:

1. A dual functional catalyst, comprising cylindrical pellets which are moulded such that a cross-section of each pellet has a window-lattice shape with external teeth or a star shape with inner spokes, wherein in said window-lattice shape, the distance between two opposite sides in each cell is within the range of 2–8 mm, the thickness of the rib is within the range of 1–6 mm, and wherein in said star shape with inner spokes, the number of spokes is 2–20, the thickness of the rib is within the range of 1–6 mm, and wherein the catalyst is simultaneously and efficiently capable of performing catalysis and fractionation functions when it is directly and randomly loaded into a reaction section of catalytic distillation equipment.

2. The dual functional catalyst according to claim 1, wherein each pellet is from 6 to 100 mm in diameter and the ratio of height to diameter of each pellet is from 0.2 to 3.

3. The dual functional catalyst according to claim 2, wherein the ratio of height to diameter of the pellet is from about 0.5 to 2.

4. The dual functional catalyst according to claim 1, wherein the free space inside each pellet occupies from 20% to 70% of the pellet volume.

5. The dual functional catalyst according to claim 4, wherein the free space inside each pellet occupies from 30% to 60% of the pellet volume.

6. The dual functional catalyst according to claim 1, wherein the catalyst is prepared by sulfonating the powder of copolymer of styrene and divinylbenzene with concentrated sulfuric acid, adding a binder to the sulfonated powder, and then moulding the resulting blend into shape in a moulding machine.

7. The dual functional catalyst according to claim 1, wherein the catalyst is prepared by adding a binder to the powder of copolymer of styrene and divinylbenzene, moulding the resulting blend into shape in a moulding machine, and then sulfonating the moulded matter with concentrated sulfuric acid, to obtain the catalyst.

8. The dual functional catalyst according to claim 1, wherein the catalyst is prepared by using aluminum hydroxide as a feedstock, moulding the feedstock into shape, calcining the moulded matter at from 800 to 1500° C. to form an alumina carrier, then impregnating the resulting carrier with the solution of a palladium salt, and drying the impregnated carrier, then forming a Pd—$Al_2O_3$ catalyst containing from 0.01 to 1.0% Pd by decomposing and reducing the dried product.

9. The dual functional catalyst according to claim 8, wherein the moulded matter is calcined at from 900 to 1300° C.

10. The dual functional catalyst according to claim 9, wherein the Pd—$Al_2O_3$ catalyst contains from 0.02 to 0.6% Pd.

11. The dual functional catalyst according to claim 1, wherein the catalyst is prepared by using aluminum hydroxide as a feedstock, moulding the feedstock into shape and drying the moulded matter, then calcining at from 300 to 900° C. to form an alumina carrier, and impregnating the calcined carrier with a salt of metal selected from Groups VI and/or VIII, then decomposing and sulfiding the impregnated carrier at from 300 to 800° C. to obtain the catalyst.

12. The dual functional catalyst according to claim 11, wherein the moulded matter is calcined at from 400 to 600° C.

13. The dual functional catalyst according to claim 12, wherein the impregnated carrier is decomposed and sulfided at from 450 to 600° C.

14. The dual functional catalyst according to claim 1, wherein the catalyst is a solid superacid catalyst prepared by using zirconium nitrate as a feedstock, precipitating the feedstock with aqueous ammonia of pH from 8 to 12 washing the resulting precipitate with water to neutrality, drying it at from 110 to 120° C.; sulfonating the dried precipitate with sulfuric acid of from 0.1 to 3.0 mol/L for a reaction time of from 2 to 3 h, then washing it with water again to neutrality, drying, adding a binder to the dried product, moulding the product into shape, and then activating the moulded product at from 200 to 600° C.

15. The dual functional catalyst according to claim 14, wherein the aqueous ammonia is of pH from 9 to 10.

16. The dual functional catalyst according to claim 15, wherein the sulfuric acid is of from 0.5 to 1 mol/L.

17. The dual functional catalyst according to claim 16, wherein the moulded product is activated at from 300 to 450° C.

18. The dual functional catalyst according to claim 1, wherein the catalyst is prepared by kneading a molecular sieve and a binder, moulding the resulting blend into shape, then calcining the moulded matter at from 300 to 900° C. to obtain the catalyst.

19. The dual functional catalyst according to claim 18, wherein the moulded matter is calcined at from 400 to 700° C.

* * * * *